(12) United States Patent
Turner et al.

(10) Patent No.: US 11,982,236 B2
(45) Date of Patent: May 14, 2024

(54) TITANIUM ALLOY COMPRESSOR CASE

(71) Applicant: General Electric Company, Schenectady, NY (US)

(72) Inventors: Alan Glenn Turner, Wyoming, OH (US); Andrew Philip Woodfield, Maineville, OH (US); Leonardo Ajdelsztajn, Niskayuna, NY (US); Laura Cerully Dial, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/853,631

(22) Filed: Dec. 22, 2017

(65) Prior Publication Data

US 2019/0195135 A1    Jun. 27, 2019

(51) Int. Cl.
*F04D 29/02* (2006.01)
*B32B 15/01* (2006.01)
(Continued)

(52) U.S. Cl.
CPC .............. *F02C 7/25* (2013.01); *B32B 15/013* (2013.01); *B32B 15/015* (2013.01); *C22C 14/00* (2013.01);
(Continued)

(58) Field of Classification Search
CPC ....... F02C 7/25; B32B 15/013; B32B 15/015; B32B 2255/06; B32B 2255/205;
(Continued)

(56) References Cited

U.S. PATENT DOCUMENTS 3,060,557 A * 10/1962 Rostoker .............. B23K 20/227
428/662
4,155,680 A   5/1979 Linko et al.
(Continued)

FOREIGN PATENT DOCUMENTS

GB   2 155 551 A   9/1985
WO   WO 2010/026179 A1   3/2010
WO   WO 2010/026181 A1   3/2010

OTHER PUBLICATIONS

Rajendran, Gas turbine coatings—An overview, Aug. 31, 2012, SciVerse Science Direct, Engineering Failure Analysis, URL: <https://reader.elsevier.com/reader/sd/pii/S1350630712001240?token=DBEDA164D40D49899231CC5B52BDD6B6234B1EE171CD21412A63EEE1005E62109538CC6CC119C7CB08CDAE0942E39458>, pp. 355-369 (Year: 2012).*

(Continued)

*Primary Examiner* — Humera N. Sheikh
*Assistant Examiner* — Katherine A Christy
(74) *Attorney, Agent, or Firm* — Hanley, Flight & Zimmerman, LLC

(57) ABSTRACT

A titanium-based component having a high heat capacity surface. The high heat capacity surface prevents or inhibits titanium fires. The component is titanium-based, forming the substrate, and includes a high heat capacity surface overlying the titanium substrate. A diffusion barrier is intermediate the titanium-based substrate and the high heat capacity surface. The diffusion barrier is non-reactive with both the titanium-based substrate and the high heat capacity surface. The system eliminates the formation of detrimental phases due to diffusion between the applied high heat capacity surface and the titanium substrate. The high heat capacity material has a coefficient of thermal expansion compatible with the coefficient of thermal expansion of the titanium-based substrate. The stresses introduced into the component (Continued)

as a result of differential thermal expansion between the high heat capacity material and the titanium-based substrate do not result in spalling of the substrate at the operational temperatures of the component.

10 Claims, 1 Drawing Sheet

(51) Int. Cl.
*C22C 14/00* (2006.01)
*C23C 24/04* (2006.01)
*F01D 11/08* (2006.01)
*F02C 7/25* (2006.01)
*F04D 19/00* (2006.01)
*F04D 29/40* (2006.01)
*F04D 29/52* (2006.01)

(52) U.S. Cl.
CPC .............. *C23C 24/04* (2013.01); *F01D 11/08* (2013.01); *F04D 19/002* (2013.01); *F04D 29/023* (2013.01); *F04D 29/403* (2013.01); *F04D 29/526* (2013.01); *B32B 2255/06* (2013.01); *B32B 2255/205* (2013.01); *F05D 2300/174* (2013.01); *F05D 2300/5023* (2013.01); *F05D 2300/611* (2013.01); *Y10T 428/12806* (2015.01)

(58) Field of Classification Search
CPC ............. C22C 14/00; Y10T 428/12806; F05D 2300/174; F05D 2300/5023; F05D 2300/611
USPC ........................................................ 428/660
See application file for complete search history.

(56) References Cited

U.S. PATENT DOCUMENTS

| | | | |
|---|---|---|---|
| 4,659,282 A | 4/1987 | Popp | |
| 4,689,282 A | 4/1987 | Popp | |
| 4,692,385 A * | 9/1987 | Johnson | ................. C23C 28/00 428/469 |
| 6,364,932 B1 * | 4/2002 | Ji | ............................ C23C 24/04 95/12 |
| 7,553,385 B2 | 6/2009 | Haynes | |
| 8,662,838 B2 | 3/2014 | Oikawa et al. | |
| 8,888,448 B2 | 11/2014 | Ferrer et al. | |
| 2006/0216428 A1 | 9/2006 | DeBiccari et al. | |
| 2010/0143108 A1 | 6/2010 | Uihlein et al. | |
| 2011/0211945 A1 | 9/2011 | Ferrer et al. | |
| 2011/0268566 A1 * | 11/2011 | Ferrer | ................... B21C 37/154 415/200 |
| 2013/0343900 A1 | 12/2013 | Stiehler et al. | |
| 2014/0272459 A1 * | 9/2014 | Daugherty | ........ H01J 37/32477 428/654 |
| 2014/0308493 A1 * | 10/2014 | Ganesh | ..................... F01D 5/28 428/216 |
| 2016/0138423 A1 | 5/2016 | Ottow et al. | |
| 2016/0362774 A1 | 12/2016 | Strock et al. | |

OTHER PUBLICATIONS

Moridi et al., Cold spray coating: review of material systems and future perspectives, 2014, Surface Engineering, vol. 36, No. 6, URL: <http://amoridi.mit.edu/sites/default/files/documents/Cold%20spray%20coating%20review%20of%20material%20systems%20and%20future%20prespectives.pdf>, pp. 369-395 (Year: 2014).*

* cited by examiner

TITANIUM ALLOY COMPRESSOR CASE

FIELD OF THE INVENTION

The present invention provides fire protection for titanium and titanium alloys, and specifically, for titanium and titanium alloys used as compressor cases in gas turbine engines.

BACKGROUND OF THE INVENTION

Titanium and certain titanium alloys are subject to ignition resulting in fires in the presence of oxygen under certain conditions. This can occur in machinery when titanium structures are exposed to friction, such as results from rubbing or when debris is lodged between a rotating part and a stationary part, at least one of the rotating part and stationary part being comprised of titanium. One type of machinery that employs titanium and its alloys are gas turbine engines, and in particular, gas turbine engines used in aircraft and aerospace applications, which take advantage of the high strength and low density of titanium and its alloys.

Gas turbine engines operate by burning fuel and extracting energy from the combusted fuel to generate power. Atmospheric air is drawn into the engine from the environment, where, in the compressor section it is compressed in multiple stages to significantly higher pressure and higher temperature. A portion of the compressed air is then mixed with fuel and ignited in the combustor section to produce high energy combustion gases. The high energy combustion gases then flow through the turbine section of the engine, which includes a plurality of turbine stages, each stage comprising turbine vanes and turbine blades mounted on a rotor. The high energy combustion gases create a harsh environment, causing oxidation, erosion and corrosion of downstream hardware. The turbine blades extract energy from the high energy combustion gases and turn the turbine shaft on which the rotor is mounted. The shaft may produce mechanical power or may directly generate electricity. Hot gases exiting the turbine section pass into the exhaust section. Gases exiting the exhaust section are used to propel the aircraft. A portion of the compressed air is also used to cool components of the turbine engine downstream of the compressor, such as combustor components, turbine components and exhaust components.

Titanium and its alloy find particular use in the multiple stages of the compressor section in applications such as bladed disks, blisks, vanes and spools, and cases surrounding the rotating airfoils and stationary vanes. The limiting temperature in a compressor of titanium and its alloys is about 900°-1000° F., which is well below the ignition point of titanium. This limit is due to the creep strength of titanium and its alloys at temperatures above about 900°-1000° F. and higher, and its propensity to slowly absorb oxygen at these higher temperatures and gradually embrittle over time. However, titanium and its alloys may be ignited in these applications by mechanical rubbing, which may be caused by a number of factors including foreign or domestic objects lodged between the rotor and a casing, rotor imbalance wherein the rotating blade rubs against the titanium or titanium alloy case, rotor displacement or case bending. The high pressure case (HPC) is most susceptible to these problems as the clearances are very small, the rotational speeds of the compressor blades are the highest and the temperature is the highest, above about 700° F.

Current constructions for compressor section components such as compressor cases utilize superalloy materials, steel or nickel-based materials, adding weight to the component, which is undesirable in aerospace applications. Alternative constructions utilize thick-walled titanium or double-walled titanium construction, adding weight to the component and exotic thermal barrier coating (TBC) systems to minimize ignition in rub scenarios, adding cost to the component. What is needed is a construction that advantageously continues to utilize low density titanium or titanium alloys, yet reduces the likelihood of a titanium fire when rubbing conditions are encountered while avoiding the excess weight of superalloy constructions or excess titanium with expensive coating systems

BRIEF DESCRIPTION OF THE INVENTION

A titanium or titanium alloy is used as the base material for a component. A layer of material of high thermal conductivity material forming an integral liner is applied to the titanium or titanium alloy component at least along those areas in which a rub with an adjacent part is predicted or otherwise expected as a result of operations, or impingement of molten titanium from ignition of Ti blades and/or vanes. The high specific heat material should also have a coefficient of thermal expansion (CTE) that is compatible with the titanium or titanium alloy component base material. The application of high specific heat material to the titanium or titanium alloy base material also must be accomplished so that the high specific heat material does not react with the titanium or titanium alloy base material at temperatures of operation, forming detrimental phases or otherwise reacting only minimally. While the high thermal conductivity material may function as a wear surface, its primary purpose is to reduce the effect of heat due to friction from rub events or from impingement of molten titanium from ignition of Ti blades and/or vanes.

A component comprising a titanium or titanium alloy base material (Ti) further comprises a high specific heat material overlying at least a portion of the titanium or titanium alloy base material. The high specific heat material overlies the titanium or titanium alloy base material at least in areas in which a mechanical event such as a rub can occur which might otherwise overheat the base material to the point of ignition, or impingement of molten titanium from ignition of Ti blades or vanes. A diffusion barrier is intermediate the high specific heat material and the titanium or titanium alloy base material, the diffusion barrier being a thin layer overlying the titanium or titanium alloy base material and underlying the high specific heat base material.

The component of the present invention advantageously is light in weight due to the use of the low density titanium or titanium alloy, yet reduces the likelihood of a titanium fire and breach of the HPC case due to the use of a high specific heat liner material in areas in which mechanical events such as rubbing can occur or areas where molten titanium from ignition of Ti blades and/or vanes may occur.

The component of the present invention also is resistant to the formation of detrimental phases between the titanium or titanium alloy base material and the applied high specific heat surface material forming a liner when operated at elevated temperatures by the use of a diffusion barrier between the high specific heat material liner material which also has high thermal conductivity and the titanium or titanium alloy base material. Another advantageous feature of the diffusion barrier is to prevent localized melting which might occur in the event of a heavy rub onto the liner or impinging molten titanium from ignition of Ti blades and/or vanes. If either of these high heat input processes were to occur and no diffusion barrier existed between the titanium or titanium alloy case and the high specific heat surface material, interdiffusion between the two materials may occur, resulting in the formation of a molten layer, likely breach and combustion of the titanium or titanium alloy HPC case. The diffusion layer prevents the formation of low melting point phases. When the high specific heat material is sufficiently thick, it may be possible to fabricate the component without a diffusion layer as the high heat capacity layer can absorb sufficient heat during a rub event and/or impingement of molten Ti from a Ti blade/vane fire, such that no low melting point eutectic can form and the case will not deform, breach and ignite.

The component of the present invention will not distort as a result of differential thermal expansion between the applied high specific heat surface material and the titanium or titanium alloy base material, nor will the high specific heat layer spall when used at elevated temperatures since the high specific heat material forming the liner is selected based on having a CTE that is compatible with that of the titanium or titanium alloy base material. Further, the component may be tightly toleranced since the high specific heat material forming the thermal liner will expand or contract at or close to the same rate of the titanium or titanium alloy base material. Thus, no allowances that affect clearances have to be included to account for differential thermal expansion between the high specific heat liner material and the titanium or titanium alloy base material.

When the component of the present invention is used as a high pressure compressor forward case in an aircraft gas turbine, an improvement in fuel burn of 0.07% is attributed to the use of this liner/base material combination as compared to steel case alternative, while reducing the likelihood of a titanium fire in a titanium or titanium alloy case alternative.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Titanium and its alloys are used in those applications requiring strength, but in which weight must be kept to a minimum. Titanium and its alloys have a tensile strength that approaches that of steel, but has a density that is about one-half that of steel. As used herein, unless otherwise specified, the term titanium or the symbol Ti refers to both titanium and its alloys.

Titanium has tensile strength similar to that of low alloy steel, about 63 ksi. However, titanium has a density that is about 56% that of steel, steel having a density of about 7.88 gm/cm$^3$, while Ti has a density of about 4.41 gm/cm$^3$. Ti has a significant advantage over steel where strength-to-weight ratio is a concern.

Weight is a major consideration in virtually all aircraft applications, and strength-to-weight ratio is of particular concern for components of aircraft engines. Thus, for many applications, titanium is the material of choice. One titanium alloy used in aircraft and aircraft engine applications is Ti 6-2-4-2. Ti 6-2-4-2 has a nominal composition in weight percent, of 6% aluminum (Al), 2% tin (Sn), 4% zirconium (Zr), 2% molybdenum (Mo) and the balance titanium (Ti). Unless otherwise specified, all compositions are specified in weight percentages. Ti 6-4 is another titanium alloy used in aircraft applications and has a nominal composition of 6% Al, 4% vanadium (V) and the balance Ti.

While titanium provides a clear strength-to-weight advantage for most applications in which strength-to-weight is a major consideration, for applications involving contacting surfaces at high speeds, overheating and ignition of titanium as a titanium fire is a major concern. Of course, aircraft engine applications include such contacting components comprising titanium that operate at high speed, and uncontained titanium fires are a major concern. More specifically, the fan and compressor sections of the engine include titanium blades rotating at high speeds. When the mating cases comprise titanium, uncontained titanium fires are a possibility. One solution to preventing titanium fires, for example in the forward case of a high pressure compressor (HPC) of an aircraft engine is to fabricate the forward case of a steel, such as M152 steel. Of course, this imposes a weight penalty. Another solution, such as used in some high performance engine designs, is to provide a split case, in which a portion of the case is a liner comprising 17-4PH steel. This separate liner is attached to the case and held in place mechanically. This solution also imposes a weight penalty in that both the 17-4 liner and the mechanical attachments securing the liner to the remainder of the case add weight. Another solution is to provide thick Ti cases or double walled Ti cases along with exotic TBC systems, which undesirably add both weight and cost to the component.

Figure 1A:
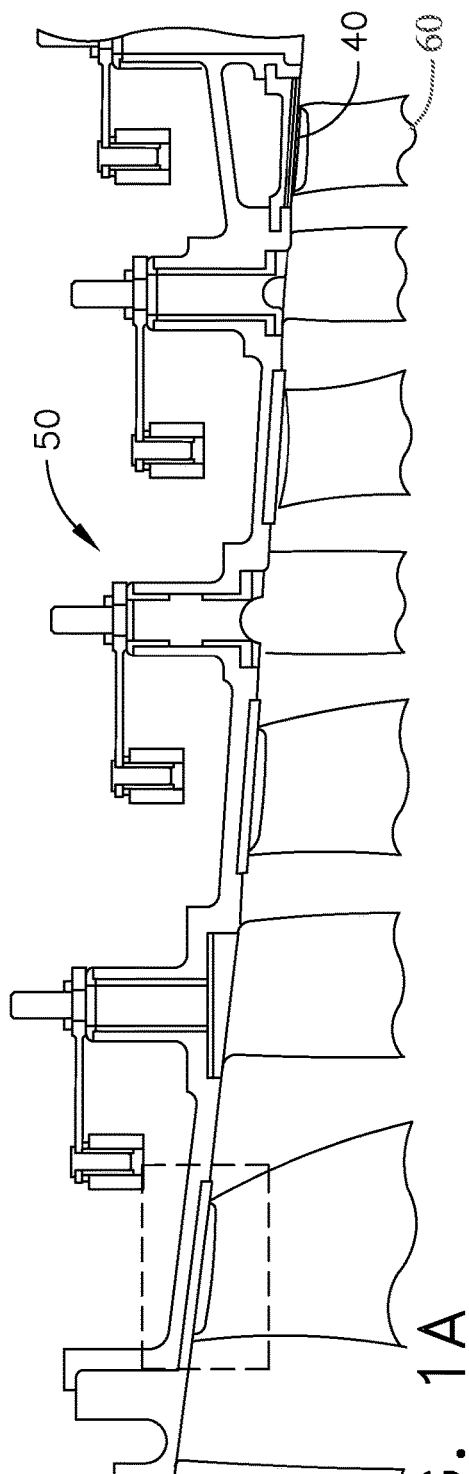
FIG. 1 depicts an exemplary titanium case with the high specific heat material system of the present invention applied to the case opposite a rotating titanium blade.
Figure 1B:
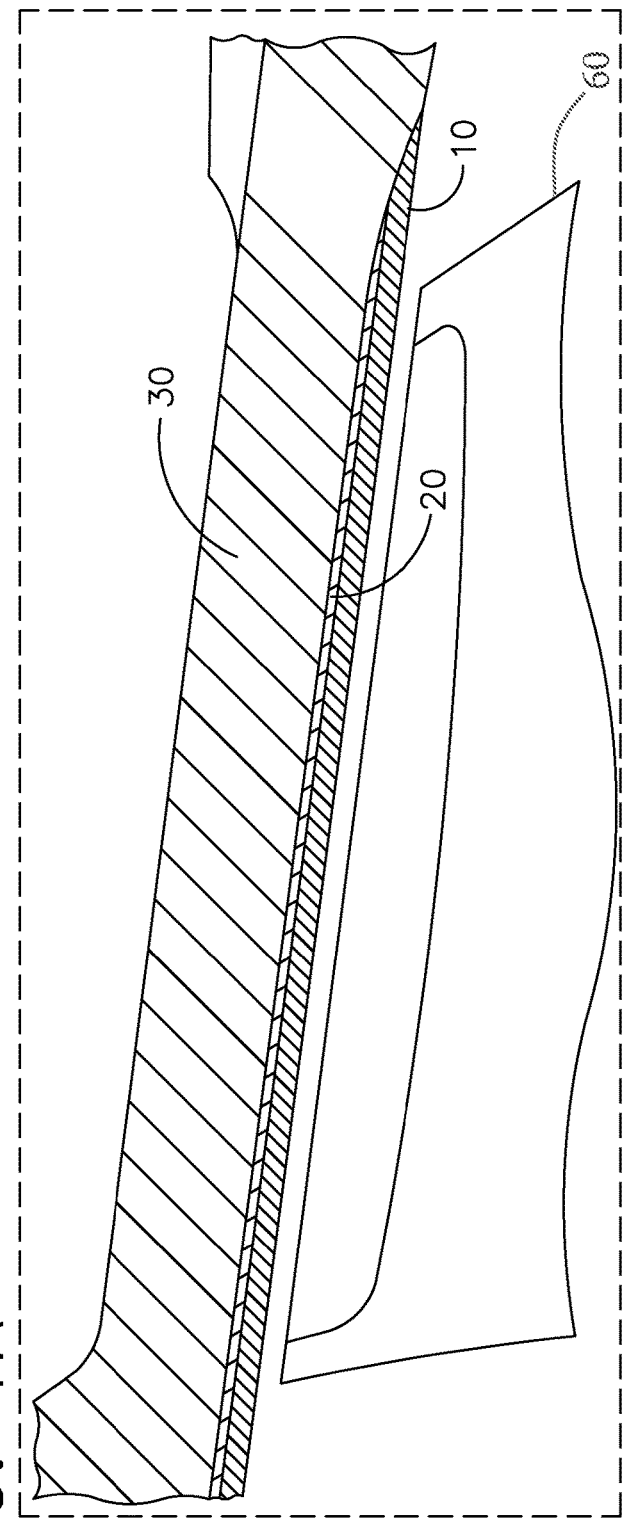

The solution to the problem of titanium rubs and/or molten titanium containment is set forth in the example titanium case 50 with high specific heat material 10 applied to the case 50 opposite a rotating titanium blade 60 in FIG. 1. In FIG. 1(a), a titanium case 50 includes a high specific heat material coating system applied as a liner 40. FIG. 1(b) is an enlarged view of one of the liners 40 of FIG. 1(a). In its broadest embodiment, a high specific heat material 10 system having a high coefficient of thermal expansion consistent with the CTE of the titanium substrate is applied over a titanium substrate 30. This high specific heat material comprises a material, and more specifically an alloy such as a steel or superalloy, selected from the group consisting of IN909, IN783, M152, 15-5PH and 17-4PH. The composition of each of these alloys is provided in Table 1, below. In one embodiment, the substrate 30 is an HPC forward case comprising Ti 6-2-4-2. The high specific heat material 10 is applied to the liner region 40 of the forward case 50 to a thickness of from about 5 mils (0.005 inches) up to about 100 mils (0.100 inches) and preferably about 10-60 mils (0.010-0.060 inches). Since the thickness of HPC forward case 50 in the vicinity of the liner is about ¼"(250 mils) in thickness, the applied high specific heat material is about ⅓ of the liner thickness. Thus as compared to the 17-4PH liner used in some high performance engine HPC forward cases, this solution allows for replacement of about 0.180 mils of 17-4PH steel with titanium, and specifically Ti 6-2-4-2. This solution thus provides the HPC forward case 50 with a significant weight reduction.

TABLE 1

|  | IN909 | IN783 | M152 | 15-5 PH | 17-4 PH |
| --- | --- | --- | --- | --- | --- |
| Ni | 35-40 | 26.0-30.0 | 2.0-3.0 | 3.5-5.5 | 3.0-5.0 |
| Cr | 1.0 max | 2.5-3.5 | 11.0-12.5 | 14.0-15.0 | 15.0-17.5 |
| Co | 12-16 | Balance |  |  |  |
| Fe | balance | 24.0-30.0 | Balance | Balance | Balance |
| Nb | 4.3-5.2 | 2.5-3.5 |  |  |  |
| Ti |  | 0.1-0.4 |  |  |  |
| Nb + Ti |  |  |  | 0.15-0.45 | 0.15-0.45 |
| Al |  | 5.0-6.0 |  |  |  |
| B | 0.012 max | 0.003-.012 |  |  |  |
| C |  | 0.003 max | 0.08-0.13 | 0.07 max | 0.07 max |
| Mn | 1.0 max | 0.5 max | 0.5-0.9 | 1.0 max | 1.0 max |
| Si |  | 0.5 max | 0.35 max | 1.0 max | 1.0 max |
| P | 0.015 max | 0.015 max | 0.025 max | 0.04 max | 0.04 max |
| S | 0.015 max | 0.005 max | 0.025 max | 0.03 max | 0.03 max |
| Cu | 0.5 max | 0.5 max | 0.5 max | 2.5-4.5 | 3.0-5.0 |
| V |  |  |  | 0.25-0.4 |  |
| Mo |  |  |  | 1.5-2.0 |  |

As noted, the high specific heat material must have a CTE that is compatible with titanium. Since high pressure compressors operate at elevated temperatures, significant differences in a CTE between the high specific heat material forming the liner and the substrate introduce significant stresses between the applied high specific heat material and the substrate. This differential thermal expansion and the resulting stresses can result in the spalling of the high specific heat material from the substrate at the operational temperatures of the compressor. Spalling may not occur immediately, but cyclic operation of the compressor eventually may result in spalling. Titanium has a CTE of about 5.6 in./in./° F. IN909 has a CTE of about 4.2 in./in./° F. ($10^{-6}$). IN783 has a CTE of about 5.6-7.15 in./in./° F. ($10^{-6}$). M152 has a CTE of about 7.2 in./in./° F. ($10^{-6}$). 15-5PH has a CTE of about 6.5-7.2 in./in./° F. ($10^{-6}$). 17-4PH has a CTE of about 6.5-7.2 in./in./° F. ($10^{-6}$). These CTE's are compatible with titanium up to the maximum operating temperature of a stage 4 HPC compressor case, which may exceed 800° F., so that significant stresses are not developed between the wear coating layer and the component substrate.

While high specific heat material 10 may be applied over the titanium substrate 30, the wear coatings selected from the group consisting of IN909, IN783, M152, 15-5PH and 17-4PH react with titanium forming low melting point eutectic phases. To prevent the formation of these detrimental low melting point eutectic phases, a diffusion barrier layer, depicted as layer 20 in FIG. 1, is applied between over titanium substrate 30 and under high specific heat material 10. Diffusion barrier layer 20 between the titanium substrate 30 and the high specific heat material liner 10 must be compatible with both the titanium base material and the liner material so as not to interact with either, while also preventing interaction between the titanium alloy base material and the material comprising the high thermal conductivity liner. As used herein, "interact" is defined as forming a low melting point eutectic phase of sufficient thickness that adversely affects mechanical properties and/or CTE of the overall structure. A coating or layer of material that does not "interact" is further defined as "non-reactive" as used herein. Diffusion barriers comprising niobium (Nb), vanadium (V), chromium (Cr) and combinations thereof applied over titanium substrate 30 have been found to be effective, although any other material that does not interact with the titanium alloy base material and the applied high specific heat material while also preventing significant interdiffusion and formation of detrimental phases between them may be used.

These diffusion barrier layers may be applied by any convenient method, such as by plating, cold spray, thermal spray or additive manufacturing processing. At least one layer of diffusion barrier material is applied to a thickness sufficient to prevent interdiffusion and interaction. In one embodiment, the thickness may comprise about 2-10 mils (0.002-0.010 inches), while in another embodiment the thickness may be about 5 mils (0.005 inches). However, the functional limit is based on the thickness required to prevent interdiffusion and not arbitrary numerical limits on thickness, which may be set forth for as manufacturing tolerances.

The wear coating and the diffusion barrier layer may be applied over the titanium alloy substrate by any convenient deposition process. However, it is preferred that these layers be applied by methods that minimize melting and/or interaction between the titanium base material and the material deposited as layers over the titanium base material.

While any method may be used to apply the diffusion barrier layer and the high specific heat material, thermal spray treatments undesirably increase the chemical interaction between underlying material and the material over it. This additional melting results in mixing of chemical compositions along the interface between the underlying material and the applied layers.

Two preferred methods for applying the diffusion barrier layer to the titanium substrate and the wear coating over the diffusion barrier layer include cold spray and additive manufacturing.

One or both of the diffusion barrier layer and the high specific heat material layer may be applied by cold spraying. In cold spraying, particles of material, typically powders of preselected size are accelerated at very high velocities with a non-reactive gas toward a substrate. The high speed of the particles as they strike the target surface deform the particles and may slightly deform target surface, and the rapid deceleration of the particles as they strike the target surface heat both the surface and the particles. While both the target surface and the powder particles are heated as the powder particles collide with the surface, the powder particles are small compared to the target surface. The energy resulting from the collision is sufficient to substantially deform the powder particles, at least most of the particles, but not sufficient to substantially affect the target surface, which is a much greater mass. Extremely localized melting at the atomic layer interface between the highly deformed powder particles and the substrate may occur. As one skilled in the art will understand, the particle distribution of the powders is within a tightly controlled size distribution so that there is little difference among the velocities of the particles, which affects both the momentum and kinetic energy of the powder particles accelerated toward the substrate by the gas. Non-reactive gases include nitrogen and argon, although other inert gases may also be used. This technique can provide an interface between the substrate and the overlying layer that is very thin and in which there is minimal mixing of the material forming the substrate and the applied material.

One or both the diffusion barrier layer 20 and the high specific heat material layer 10 may be applied by additive manufacturing. In additive manufacturing, a thin layer of powder material is applied over an underlying layer in a predetermined pattern. A laser or other suitable heat source provides thermal energy which follows the applied material, melting the applied material. The applied thermal energy is carefully controlled to melt the applied powder material. Of course, the applied thermal energy can be controlled to melt the applied powder material and a portion of the substrate, which provides controlled mixing of the substrate and the applied powder material. The applied thermal energy can be controlled to melt substantially all of the powder material while minimally affecting the substrate so that there is minimal mixing between the substrate and the applied material. In additive manufacturing, the substrate and the applied material may be the same material or may be different materials. In this circumstance, since the applied material and the substrate are different materials and since it is preferred that there be minimal mixing between the substrate and the applied material, it is preferred that the applied thermal energy be adjusted so that the substrate is minimally affected while substantially melting the applied material. In additive manufacturing, additional layers can be applied to achieve the desired thickness. Once the interface layer has been formed, the parameters for applying the additional layers of material can be altered to speed deposition without affecting the interface layer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An engine component formed by a method comprising:
providing a titanium-based substrate;
applying a non-reactive second layer at a thickness of at least 0.002 inch as particles of powder to the titanium-based substrate using a cold spray process, wherein the powder comprising the second layer is accelerated toward the titanium-based substrate by a carrier gas at a velocity sufficient to deform the particles on contact with the titanium-based substrate; and then
applying a layer of first material forming a liner as particles of powder to the titanium-based substrate using a cold spray process, wherein the powder comprising the layer of first material is accelerated by a carrier gas toward the applied second layer at a velocity sufficient to deform the particles on contact with the second layer,
wherein the layer of first material is non-reactive with the second layer, wherein the second layer is formed of a second material different from the titanium-based substrate and the first material and compatible with both the titanium-based substrate and the liner, the second material selected from the group consisting of Cr, Nb, and V, alone and in combinations thereof, to prevent formation of a eutectic phase between the liner and the titanium-based substrate and maintains compatibility of coefficients of thermal expansion between the liner and the titanium-based substrate to enable the liner to expand or contract with the titanium-based substrate while preventing formation of the eutectic phase.

2. The engine component of claim 1, wherein the carrier gas is a non-reactive gas selected from the group consisting of nitrogen and inert gases.

3. The engine component of claim 1, wherein the titanium-based substrate is selected from the group consisting of titanium, Ti 6-2-4-2 and Ti 6-4.

4. The engine component of claim 1, wherein stresses introduced into the engine component as a result of differential thermal expansion between the—liner and an exterior of the engine component do not cause spalling of the liner.

5. The engine component of claim 4, wherein the layer of material forming the liner is selected from the group consisting of IN909, M152 steel, 15-5PH steel, 17-4PH steel and IN783.

6. The engine component of claim 1, wherein the second layer is applied over the engine component along an interface opposite a rotating blade to a thickness of about 0.002-0.010 inches.

7. The engine component of claim 1, wherein the layer of material forming the liner is applied to a thickness of about 0.005-0.100 inches.

8. The engine component of claim 7, wherein the layer of material forming the liner is applied to thickness of about 0.060-0.100 inches.

9. The engine component of claim 1, wherein the liner does not spall from the titanium-based substrate after temperature cycling.

10. The engine component of claim 1, wherein the engine component includes a compressor case.

* * * * *